(12) United States Patent
Shouse et al.

(10) Patent No.: US 7,441,915 B2
(45) Date of Patent: Oct. 28, 2008

(54) WATER COOLED HORTICULTURAL GROWING LIGHT

(76) Inventors: Levi Shouse, 3667 Tomahawk La., San Diego, CA (US) 92117; William Reck, 3667 Tomahawk La., San Diego, CA (US) 92117

( * ) Notice: Subject to any disclaimer, the term of this patent is extended or adjusted under 35 U.S.C. 154(b) by 0 days.

(21) Appl. No.: 11/739,517

(22) Filed: Apr. 24, 2007

(65) Prior Publication Data
US 2008/0049417 A1 Feb. 28, 2008

Related U.S. Application Data

(60) Provisional application No. 60/823,288, filed on Aug. 23, 2006.

(51) Int. Cl.
*A01G 9/00* (2006.01)
*A01G 9/20* (2006.01)
(52) U.S. Cl. .................. 362/96; 362/101; 362/294; 362/805; 47/17; 47/58.1 LS
(58) Field of Classification Search .................. 362/96, 362/101, 805, 432, 294, 373; 47/17, 58.1 LS
See application file for complete search history.

(56) References Cited

U.S. PATENT DOCUMENTS

| | | | | |
|---|---|---|---|---|
| 4,363,080 A | | 12/1982 | Sylvester | |
| 4,758,930 A | * | 7/1988 | Pomares | 362/558 |
| 4,945,457 A | * | 7/1990 | Yazdani et al. | 362/101 |
| 5,504,666 A | * | 4/1996 | Carmichael | 362/294 |
| 5,725,297 A | * | 3/1998 | Crowder et al. | 362/84 |
| 6,061,957 A | * | 5/2000 | Takashima | 47/66.1 |
| D456,938 S | | 5/2002 | Wardenburg | |
| 6,488,387 B2 | | 12/2002 | Wardenburg | |
| 6,595,662 B2 | | 7/2003 | Wardenburg | |
| 2007/0163170 A1 | * | 7/2007 | Brault et al. | 47/17 |

OTHER PUBLICATIONS

Hdroponics B.C., "Water Cooled Lights", http.www.hydroponicsbc.com/watercooledlighting.html.

* cited by examiner

*Primary Examiner*—Stephen F Husar
*Assistant Examiner*—Peggy A. Neils
(74) *Attorney, Agent, or Firm*—Lisel M. Ferguson; Procopio, Cory, Hargreaves & Savitch LLP

(57) ABSTRACT

The present invention relates, in general, to an water cooled horticultural growing light and a method of using the same. More particularly, the present invention relates to a water cooled horticultural growing light and method wherein water flows through outer glass tubes to cool the light source which sits inside an inner chamber of the invention. This invention allows for the light source to be placed in close proximity to the plants. This invention can be used in nurseries and other growing facilities to increase productivity by allowing plants to receive increased solar rays without the damaging effects of heat.

13 Claims, 3 Drawing Sheets

WATER COOLED HORTICULTURAL GROWING LIGHT

RELATED APPLICATION

The present application claims priority to provisional application No. 60/823,288 entitled WATER COOLED HORTICULTURAL GROWING LIGHT, filed on Aug. 23, 2006.

FIELD OF THE INVENTION

The present invention relates, in general, to a water cooled horticultural growing light and a method of using the same.

BACKGROUND OF THE INVENTION

Horticultural growing lights have been used for centuries. One drawback of these lights has been that they produce excessive heat and must be positioned distances away from the plants due to the heat which is produced. If one of these lights is placed too close to the plants it may burn leaves or harm the plant.

There are other horticultural growing lights which have been manufactured in such fashions to reduce the amount of heat production. These previous horticultural growing lights have many drawbacks. One major drawback of these lights is that they are manufactured from plastic, thus cannot maintain 1000 watt bulbs, and crack after periods of time due to the excessive exposure of heat and UV rays. An additional drawback of previous water-cooled lights was the fact that they were huge, heavy and difficult to handle. These lights constantly leaked and were difficult to take apart for cleaning. These lights were not durable. They were prone to cracking and meltdown, breaking and very expensive to manufacture. The current invention has overcome these drawbacks.

There is, thus, a need for a horticultural growing light which generates maximum light, can maintain a 1000 watt or greater capacity bulb, and can be placed in close proximity to plants.

SUMMARY OF THE INVENTION

Accordingly, an aspect of the invention involves a method for manufacturing a horticultural growing light which is water cooled. The method includes providing two cylindrical pyrex glass tubes. These tubes are heat resistant and not affected by UV. One tube is placed inside of the other, the interior tube houses a light bulb. Water flows between the two tubes and is pumped into one end of the space between the interior and exterior tube and comes out of the other end of the space between the interior and exterior tube. An air gap exists between the bulb and the wall of the interior tube allowing maximum thermal transfer. The water which runs through the exterior tube absorbs the heat from the light thus allowing the outside of the exterior tube to be cool to the touch. The water which flows into this apparatus can be obtained from a reservoir, a swimming pool a lake, stream or any other water source. The water then flows through the tube and is heated in the process. The heated water then exits the tube at the opposite end from its entrance and is placed back into the reservoir where the water is then cooled. The light bulbs which can be used in this apparatus are standard high pressure sodium (HPS) lamps which can vary in size and include 250, 400, 600, 750, 1000 and greater watt lamps.

Water-cooled lights offer many advantages such as:
(1) greater productivity at all times in a proper built growing chamber;
(2) increased efficiency of CO2 enhanced operations;
(3) reduced volume of ventilation, which maintains desired air composition;
(4) enables year-round operation during any weather conditions.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings.

DETAILED DESCRIPTION OF PREFERRED EMBODIMENTS

After reading this description it will become apparent to one skilled in the art how to implement the invention in various alternative embodiments and alternative applications. However, all the various embodiments of the present invention will be described herein, it is understood that these embodiments are presented by way of an example only, and not limitation. As such, this detailed description of various alternative embodiments should not be construed to limit the scope or breadth of the present invention as set forth below.

Figure 1:
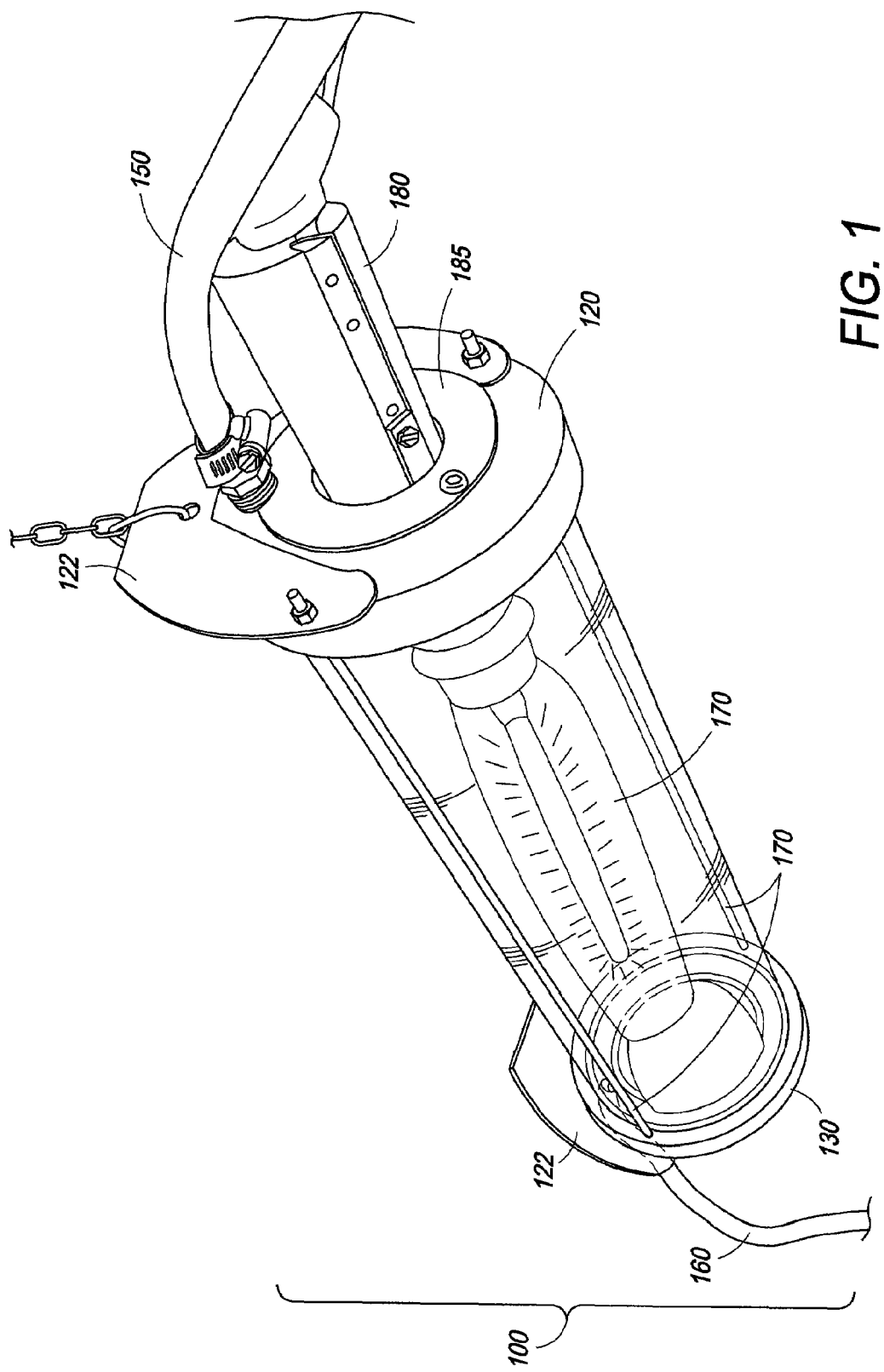
FIG. 1 is a perspective view looking up from the bottom of an embodiment of an water cooled horticultural light.

With reference to FIG. 1 a water cooled growing light 100 is shown and displayed. This light 100 is composed of two glass tubes an interior and exterior tube, two end plates on either end, two compression rods and a light source. Each end plate is configured with a connection for a hose, the one end plate is further configured with a bracket to hold electrical socket. The interior tube FIG. 2 (210) which has a smaller circumference than the exterior tube, is placed inside the exterior tube FIG. 2 220 and each tube is the same length. The end plates 120 and 130 are fitted onto the ends of the tubes. The end plates each contain a connector bracket 122 which has holes for hooks so that the same may be hung or mounted to either a ceiling or a wall either vertically or horizontally. A standard light hood can be attached to the connector brackets 122 to direct the light toward the plants. In an alternate embodiment this light comes equipped with an interior light reflector which fits inside the inner tube and is constructed of a metal substance. A light bulb or other light source 170 is inserted into the inner tube 210. This light source 170 connects to a prepurchased all system socket 180 which feeds through the end plate 120 at one end of the tubes. The socket is bracketed onto a metal plate 185 (the bracket) on the outside surface of the intake end plate 120. An intake water tube 150 connects to the connector on the outside surface of intake endplate 120.

Figure 5:
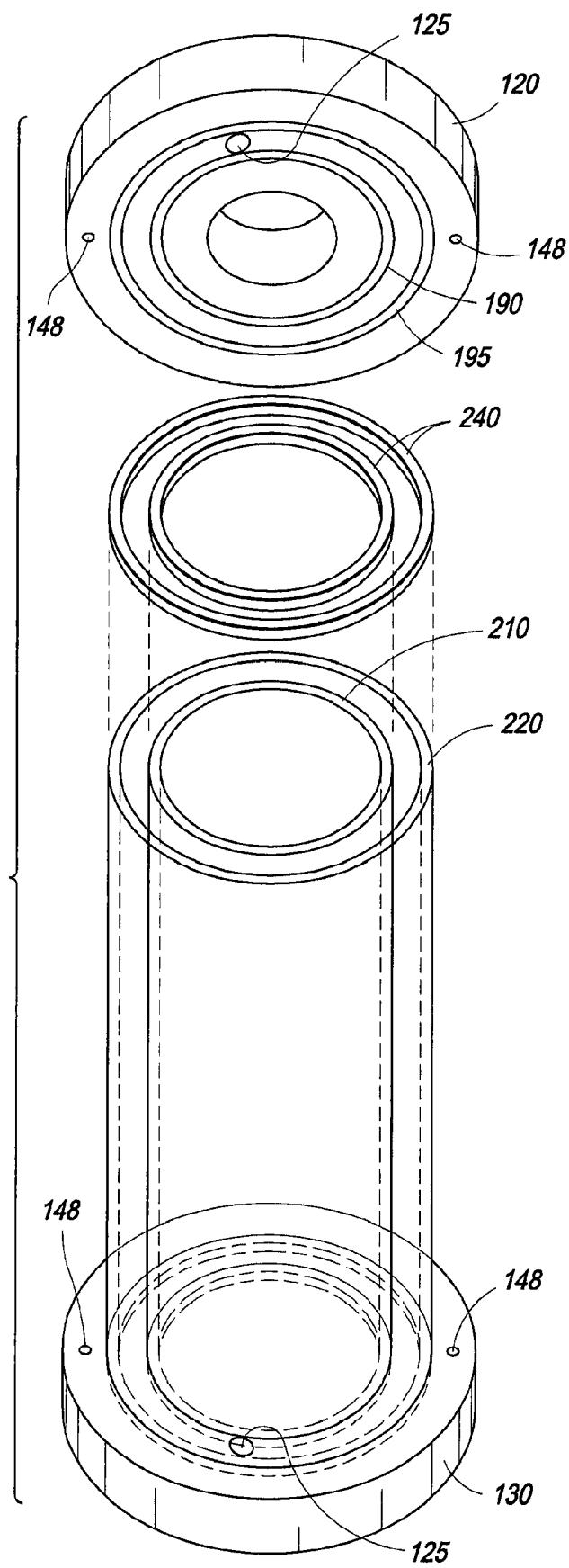
FIG. 5 is a perspective view of the tubes and end plates with on end plate removed of a growing light shown in FIG. 1.

The inside surface of each end plate have two circular channels FIG. 5 (190 and 195) into which the glass tubes fit.

The inner tube 210 inserts into the interior channel 190 which circles the entire circumference on the inside surface of each end plate. The inner tube 210 is inserted into the inside of the outer tube 220. The outer tube 220 fits into the outer channel 195 which circles the entire circumference on the inside surface of each end plate. Two metal compression rods 140 are installed to secure the end plates 120 and 130 and the tubes 210 and 220. The metal compression rods 140 are fed through a hole in the intake end plate 120 and through a hole in the output end plate 130. Either end of these metal compressor rods 140 is threaded. A nut 145 twists on to each end of the rod 140 on the exterior surface of each end plate 120 and 130. Twisting the nuts on either end of the rod press the end plates 120 and 130 into the glass tubes 210 and 220 and hold the water cooled growing light together. The connection between the tubes and the end plates are water tight, a custom made square o-ring 240 fits in each channel 190 and 195 of the inside surface of the end plates 120 and 130 to seal the connection with the ends of the glass tubes 210 and 220.

There are hose connections on each end plate 120 and 130 which feed into the space between the inner and the outer tube 210 and 220. An input hose 150 is threaded onto one end plate, while an output hose 160 is threaded onto the opposite end plate. Water is passed by the input hose 150 into the space between the interior glass tube 210 and exterior glass tube 220. This water passes through the growing light and the heat from the light source is thermally absorbed by the water. The water then passes out the opposite end of the tube through the output hose 160. The water that exits the growing light passes back into a water chamber where it is cooled by mixing with existing water or by a cooling source before entering back into the water cooled growing light. In the center the bulb or other light source 170 is shielded from the water by the air space which exists between the bulb 170 and the interior face of the inner glass tube 210. The exterior of the water cooled light 100 is cool to the touch due to the fact that the water is passing between the light and exterior of the tube which cools the growing light and causes the exterior not to exude heat. The coolness of this light allows it to be placed closer to plants thus increasing the potential growth and productivity of the plants.

Figure 2:
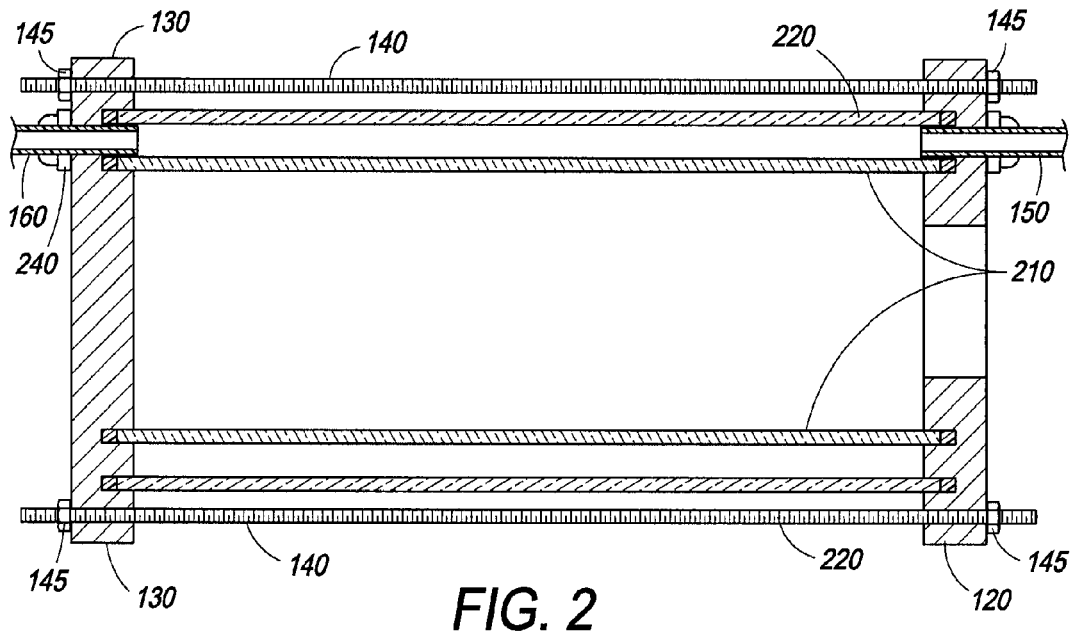
FIG. 2 is a cross section view of the tubes and end plates of the water cooled horticultural growing light shown in FIG. 1.

FIG. 2 is a cross section view of the inner and outer glass tubes 210 and 220 and the end plates 120 and 130 of the water cooled horticultural growing light. In this diagram it can be seen that the connection to the light bulb occurs through the right hand input end plate 120. The input water tube 150 connects on the right hand side of FIG. 2 and passes water into the interior space between the inner 210 and the outer glass tubes 220. This water exits the output hose 160 shown on the left hand side. The glass tubes are securely fitted in the channels in either end plate with custom o-rings 240. The end plates are pressed into the glass tubes holding the growing light together by the metal compression rods 140 that are displayed on the top and the bottom with the nuts 145 are fed on either end of the compression rods 140.

Figures 3, 4:
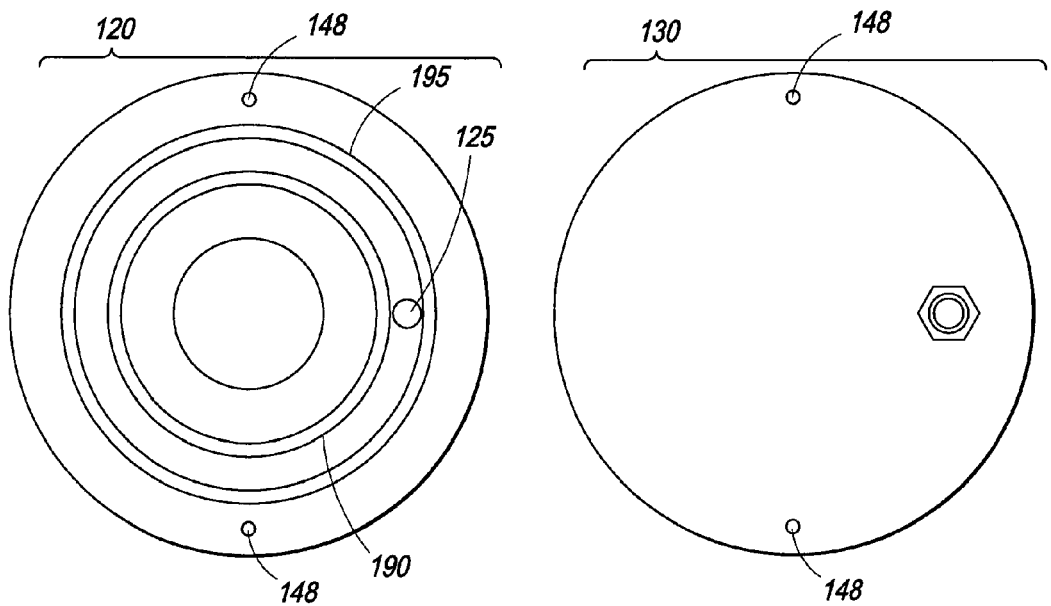
FIG. 3 is a plan view of the inside facing side of the end plate which has the electrical and intake water tube connections of the growing light shown in FIG. 1.
FIG. 4 is an outside facing side of the end plate which has the exit water tube connection.

FIG. 3 shows the interior end plate 120 which has the opening for the light and all system socket 180 to pass through. This endplate also has a hole 125 between the two channels where the hose connector attaches to the exterior surface. This hole through entire plate allows the water to pass into the space between the two tubes. Both end plates have two channels 190 and 195, one to hold the inner tube 210 and one to hold the exterior tube 220. The channels are clearly shown in FIG. 3. The two holes for the compression rods 140 are shown at the top and the bottom of this end plate.

FIG. 4 is the output end 130 plate for the light 100 where the output hose connects to expel the heated water. As can be seen from FIG. 4, the exterior face of this end plate is solid with no channels. On the exterior face there is a connection for the output water tube 160 and two holes on opposite sides of the plate for the compression rods 140 to pass through.

FIG. 5 is a perspective view of the tubes 210 and 220 and end plates 120 and 130 with on end plate removed. This Figure shows how the two glass tubes fit snuggly into the two channels 190 and 195 on either end of the end plates. This Figure further shows the two holes 148 on each end plate which line up with one another so that the compression rods 140 can be fed through to the hold the fixture together by tightening the nuts 145. Lastly, FIG. 5 shows the holes 125 on either end plate where the water enters the interior space between the two tubes and the water exits the interior space between the two tubes on the opposite end.

The water cooled growing light 100 creates a method for cooling a light source so that heat is not exuded from a light placed close to plants. The method by which this is done is water is taken from a hose outlet or other water source and run through an input hose 150 into a space between the interior and exterior tube of the light 100. The water flows through the interior space and absorbs heat from the light source 170 so it is not transferred to the exterior tube 220 which is closer to the plants. The water runs between the inner 210 and outer 220 glass tubes and flows out of the output hose 160. This water is then dumped into a drain, lake, stream or other body of water. In other embodiments of this invention the water can be taken from the same lake, stream or other water source and run through the light tubes and exuded back into the water source. The water source needs to be large enough so that the water has time to cool before it is repumped through the light. In a preferred embodiment the water flows at a rate of 3 to 30 gallons per minute through the growing light 100. If the user is utilizing a set body of water for the feed and output of the water this water body should contain at least 50 gallons of water, in the alternative if the water has a cooling system then the body can be as small as 10 gallons, to allow sufficient time for the water to cool before it is passed through the light.

The above description of disclosed embodiments is provided to enable any person skilled in the art to make or use the invention. Various modifications to the embodiments will be readily apparent to those skilled in the art, the generic principals defined herein can be applied to other embodiments without departing from spirit or scope of the invention. Thus, the invention is not intended to be limited to the embodiments shown herein but is to be accorded the widest scope consistent with the principals and novel features disclosed herein.

The invention claimed is:

1. A water cooled growing light comprising:
   two glass tubes including an interior and exterior tube both with the same length, the interior tube with a smaller circumference enabling it to be placed inside the exterior tube;
   one or more light sources;
   two end plates containing
      two channels on each of their interior surfaces enabling them to be fitted to the ends of the glass tubes,
      hose connections on the exterior surface of each end plate with a hole passing all the way through the end plate,
      one end plate configured to hold an electrical socket;
   four or more square o-rings configured to fit in the channels of the end plates; and
   two or more compressor rods configured to pass through both end plates and be secured by nuts on the outside of the end plates.

2. A water cooled growing light of claim 1, wherein a standard hose can be connected to the hose connections.

3. A water cooled growing light of claim 1, wherein the end plates contain connector brackets containing holes for hooks.

4. A water cooled growing light of claim 3 which is configured to accept standard light hoods.

5. A water cooled growing light of claim 1, including an all system socket fed through the end plate.

6. A water cooled growing light of claim 1, including a reflector shield which fits inside the interior glass tube.

7. A water cooled growing light of claim 1, wherein the glass tube is made of Pyrex.

8. A horticultural growing light comprising:
   two or more glass tubes with at least one interior tube and at least one exterior tube, the interior tubes having a smaller circumference than the next exterior tube enabling the interior tube to be placed inside the exterior tubes;
   one or more light sources inside the inner most glass tube;
   two end plates containing channels on each of their interior surfaces enabling them to be fitted to the ends of the glass tubes,
   water connections on the exterior surface of each end plate with a hole passing all the way through the end plate allowing the water to enter the space between the inner most glass tube and the exterior glass tube, and
   at least one end plate configured to hold an electrical socket.

9. A horticultural growing light of claim 8, wherein a standard hose can be connected to the end plates.

10. A horticultural growing light of claim 8, wherein the end plates contain connector brackets containing holes for hooks.

11. A horticultural growing light of claim 8 which is configured to accept standard light hoods.

12. A horticultural growing light of claim 8, including a bracket for an all system socket fed through one end plate.

13. A horticultural growing light of claim 8, including a reflector shield which fits inside the inner most glass tube.

* * * * *